(12) United States Patent
Hiraga et al.

(10) Patent No.: US 6,443,845 B1
(45) Date of Patent: Sep. 3, 2002

(54) BOOT MOUNTING STRUCTURE AND METHOD OF MOUNTING BOOT

(75) Inventors: Yoshio Hiraga; Kazuhiro Iwano; Teiji Suka; Kazunobu Haneishi; Shinya Toita, all of Tochigi (JP)

(73) Assignee: Showa Corporation (JP)

( * ) Notice: Subject to any disclaimer, the term of this patent is extended or adjusted under 35 U.S.C. 154(b) by 0 days.

(21) Appl. No.: 09/569,864

(22) Filed: May 12, 2000

(30) Foreign Application Priority Data

May 18, 1999 (JP) .......................................... 11-137794

(51) Int. Cl.[7] ................................................ F16C 1/26
(52) U.S. Cl. ............................ 464/173; 29/525; 29/511; 464/112; 464/123; 277/634; 277/637
(58) Field of Search ................................ 464/112, 123, 464/173, 175; 277/630, 634, 637, 641; 29/525, 511; F16D 3/84; F16J 15/52

(56) References Cited

U.S. PATENT DOCUMENTS

| | | | | |
|---|---|---|---|---|
| 3,822,570 A | * | 7/1974 | Fisher | 464/173 |
| 3,975,922 A | * | 8/1976 | Orain | 464/123 |
| 4,540,385 A | * | 9/1985 | Krude | 464/112 |
| 5,176,576 A | * | 1/1993 | Moulindt | 464/175 |
| 6,093,108 A | * | 7/2000 | Moulinet | 464/173 |

FOREIGN PATENT DOCUMENTS

| | | | |
|---|---|---|---|
| JP | 77614 | | 2/1995 |
| JP | 724683 | | 5/1995 |
| JP | 08-14387 | * | 1/1996 |
| JP | 08-128456 | * | 5/1996 |
| JP | 09-14284 | * | 1/1997 |

* cited by examiner

Primary Examiner—Lynne H. Browne
Assistant Examiner—Aaron Dunwoody
(74) Attorney, Agent, or Firm—Orum & Roth

(57) ABSTRACT

In a mounting structure of a boot (15), a communication passage (21) communicating a connection space (13) with an external portion can be formed in a base portion (14A) of a boot adapter (14) at least at an intermediate stage of being inserted and attached to an outer peripheral portion of a first member (an outer wheel (11A)) from an axial direction, and the connection space (13) can be sealed by shutting a communication by the communication passage (21) at least at a final stage of the insertion and attachment.

1 Claim, 4 Drawing Sheets

BOOT MOUNTING STRUCTURE AND METHOD OF MOUNTING BOOT

BACKGROUND OF THE INVENTION

1. Field of the Invention

The present invention relates to a boot mounting structure for sealing a uniform joint or the like which mounts a propeller shaft or the like, and a method of mounting a boot.

2. Description of the Related Art

Conventionally, in a boot mounting structure for sealing grease used for improving sliding performance and durability of a uniform joint, as described in Japanese Utility Model Publication (JU-B) No. 7-7614, there is a structure in which a base portion of a boot adapter is inserted and attached to an outer wheel (a first member) of the uniform joint and an elastic boot provided in a front end portion of the boot adapter is attached to an outer peripheral portion of an inner shaft (a second member).

However, when assembling the boot provided in a front end portion thereof to the inner shaft, the boot adapter compresses a connection space between the uniform joints which the boot adapter and the boot surround in the area of an inserting and attaching length during inserting and attaching the base portion to the outer wheel from an axial direction to an extent of a fixed length, thereby increasing pressure in the connection space. When the pressure in the connection space is increased, in addition to the expansion of air due to a high temperature of the grease within the boot caused by a high speed rotation together with bending operation of the uniform joint, the boot becomes easily deformed, so that there is a risk that a peripheral portion of the boot adapter or the like and the inner shaft are interfered with each other and broken, thereby deteriorating durability,

SUMMARY OF THE INVENTION

An object of the present invention is to provide a sealing structure for a joint portion which restricts pressure increase in a connection space between a first member and a second member when attaching a boot adapter to the first member during sealing of the connection space by the boot adapter and a boot.

In accordance with the present invention, there is provided a boot mounting structure in which a base portion of a boot adapter is inserted and attached to an outer peripheral portion of a first member so as to seal a connection space between the first member and a second member and a boot provided in a front end portion of the boot adapter is inserted and attached to an outer peripheral portion of the second member, wherein the base portion of the boot adapter can form a communication passage for communicating the connection space with an external portion at least at an intermediate stage of being inserted and attached to the outer peripheral portion of the first member from an axial direction, and can shut the communication by the communication passage so as to seal the connection space at least at a final stage of the attachment.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings

DESCRIPTION OF THE PREFERRED EMBODIMENTS

Figure 1A:
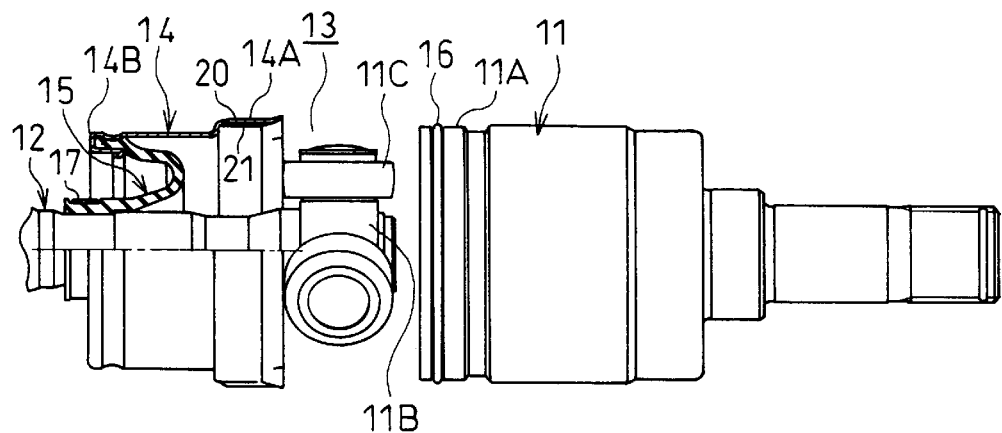
FIGS. 1A to 1C are schematic views showing a uniform joint in accordance with a first embodiment.

First Embodiment (FIG. 1A to FIG, 3C)

Figure 1B:
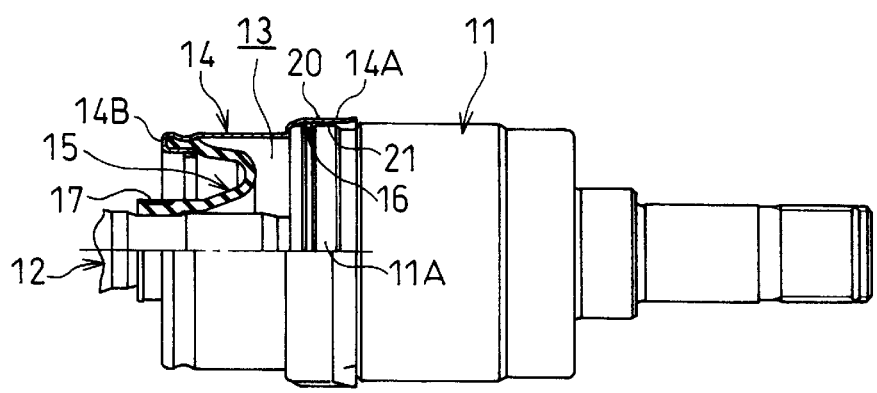
Figure 1C:
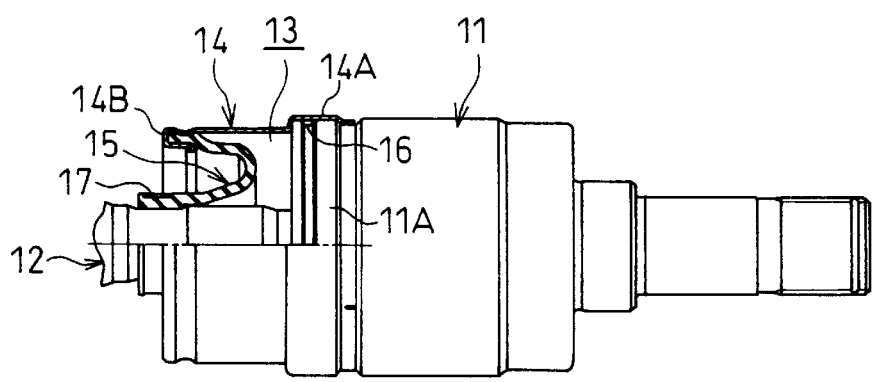
Figure 2A:
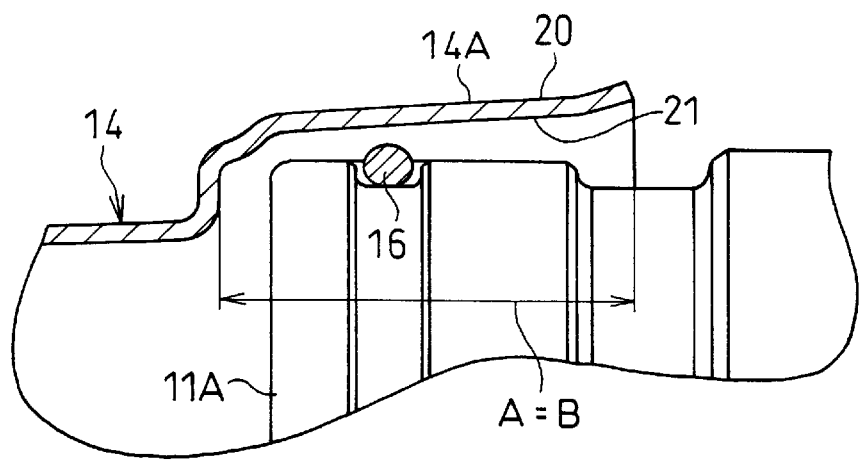
FIGS. 2A to 2C are enlarged cross sectional views of a main portion of FIG. 1.
Figure 2B:
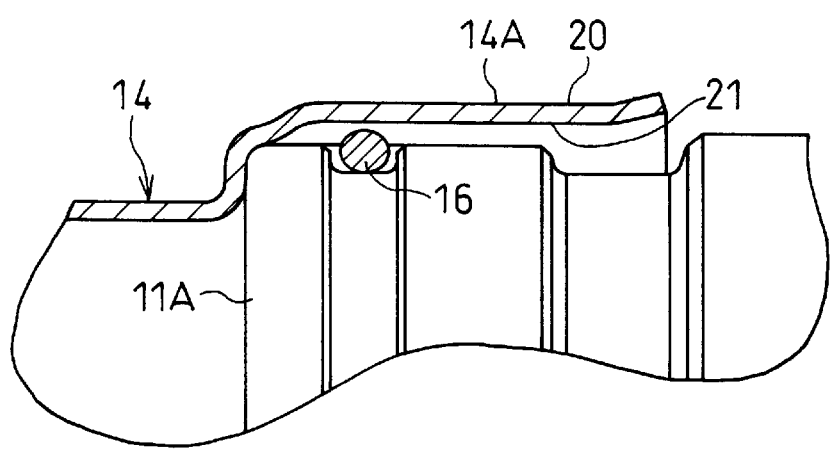
Figure 2C:
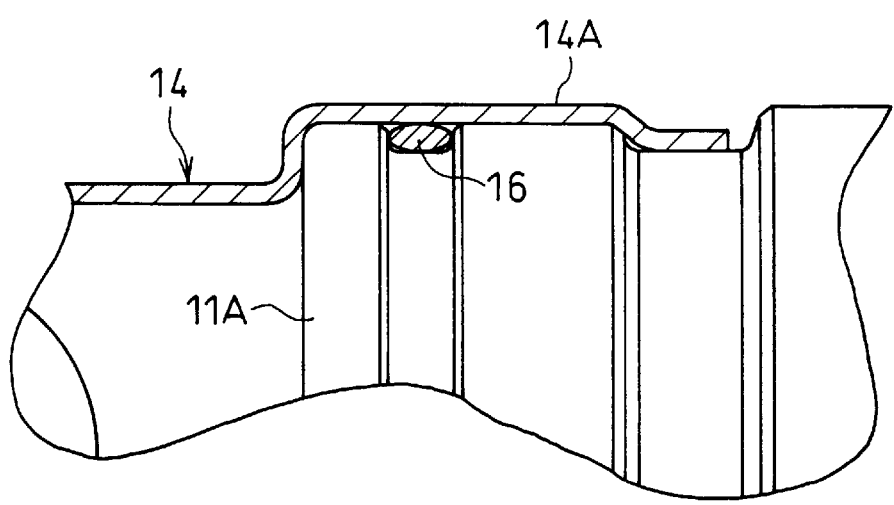
Figure 3A:
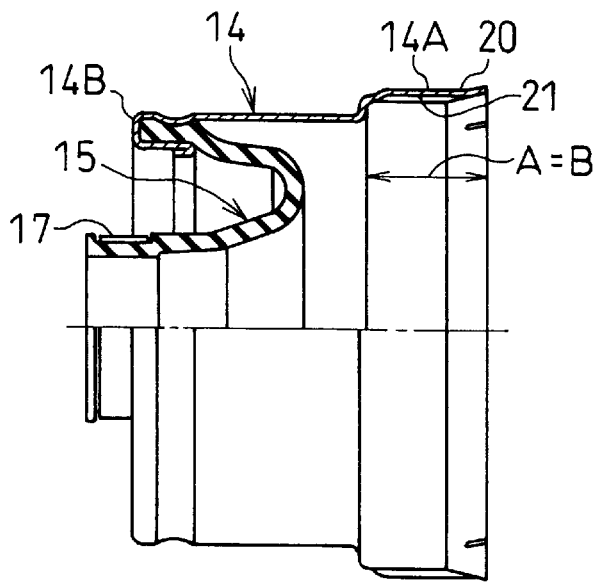
FIGS. 3A to 3C are schematic views showing a boot assembly.
Figure 3B:
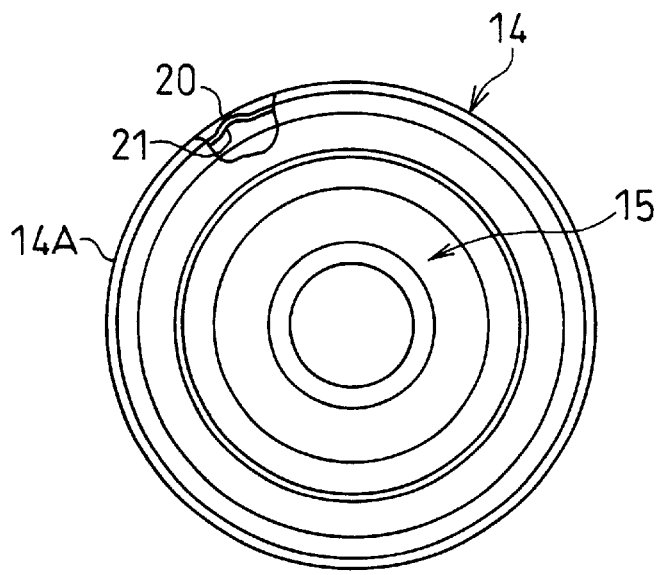
Figure 3C:
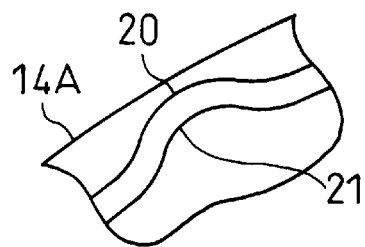
Figure 5:
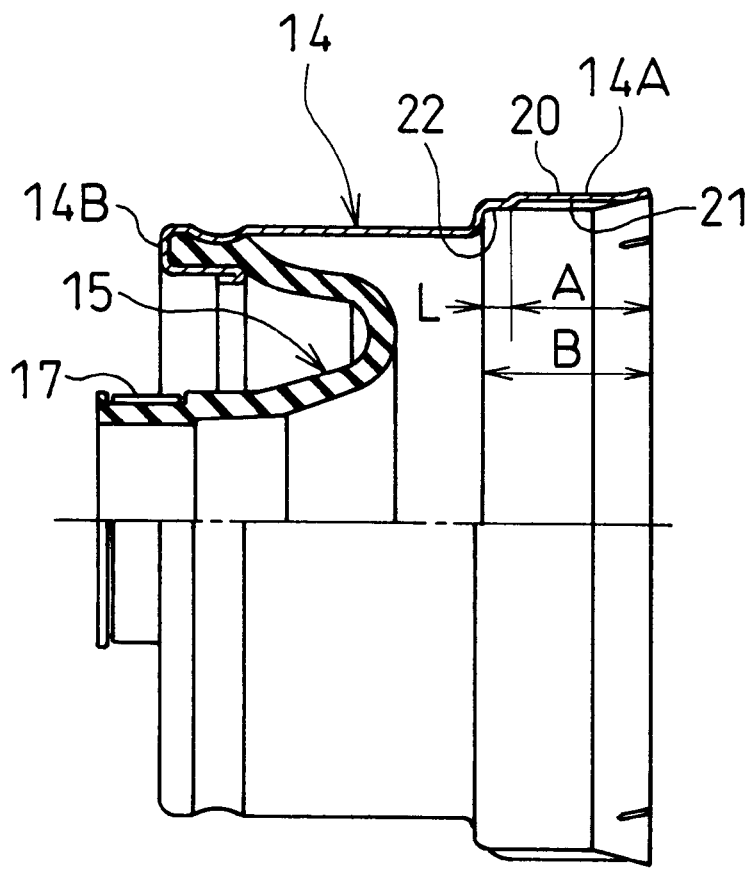
FIG. 5 is a schematic view showing a boot assembly.

A first embodiment is structured, as shown in FIGS. 1A to 1C, to seal a connection space 13 between an outer wheel 11A (a first member) of a tripod type uniform joint 11 and a roller 11C held on an inner wheel 11B fixed to an inner shaft 12 (a second member) by using a boot adapter 14 and a boot 15 so as to deliver grease for improving sliding performance and durability of the uniform joint 11 into the connection space 13.

A base portion 14A of the boot adapter 14 is inserted and attached around a seal member 16 such as an O-ring or the like provided in an outer peripheral portion of the outer wheel 11A of the uniform joint 11 so as to be caulked and fixed in a manner mentioned below, and the boot 15 provided in a front end portion 14D of the boot adapter 14 so as to be held and attached thereto is attached and fixed to the outer peripheral portion of the inner shaft 12 by a boot band 17. The boot adapter 14 is a cylindrical body constituted by a metal thin plate, and in this structure, most of the centrifugal force of the grease can be received by the metal boot adapter 14, and it is possible to prevent the boot 15 from being deformed.

Accordingly, the boot adapter 14 uses the base portion 14A inserted and attached to the outer peripheral portion of the outer wheel 1011A as an annular fitting portion fitted to the outer wheel 11A with substantially no gap, and is provided with a protruding portion 20 extending in an axial direction in a part in a peripheral direction of the base portion 14A (one or more portions In the peripheral direction), which forms a groove-like communication passage 21 extending in an axial direction on an inner surface of the protruding portion 20, as shown in FIGS. 2A to 3C. It is possible to prevent a shift in a diametrical direction together with an insertion and attachment of the boot adapter 14 by providing the protruding portion 20 in the part.

In this case, the depth of a groove of the communication passage 21 and an outer diameter and a position of the seal member 16 are set so that the communication passage 21 forms an interval between the communication passage 21 and the seal member 16 in the outer peripheral portion of the outer wheel 11A in a pre-caulking state (FIG. 2B) in which the base portion 14A of the boot adapter 14 is inserted and attached to the outer wheel 11A.

In the present embodiment, an axial-direction length A or the protruding portion 20 and the communication passage 21 provided in the base portion 14A of the boot adapter 14 is set to extend along the length of a total inserting and attaching length B of the base portion 14A with respect to the outer wheel 11A.

Accordingly, the base portion 14A of the boot adapter 14 (a) can form the communication passage 21 mentioned above communicating the connection space 13 with the external portion until the final stage of the Inserting and attaching process (all the inserting and attaching range of the length A) of being press inserted to the outer peripheral portion of the outer wheel 11A of the uniform joint 11 from the axial direction so as to be inserted and attached, and thereafter, (b) in the final stage of the insertion and attachment, can pressurize the seal member 16 in the outer peripheral portion of the outer wheel 11A by being caulked in the periphery in the peripheral direction including the protruding portion 20, and seal the connection space 13 by interrupting communication by means of the communication passage 21 mentioned above.

Accordingly, the procedures of assembling the boot 15 in accordance with the present embodiment are as follows.

(1) The boot 15 is provided in the front end portion 14B of the boot adapter 14, and the boot 15 is attached and fixed to the Inner shaft 12 by the boot band 17.

(2) The base portion 14A of the boot adapter 14 is press inserted to the outer wheel 11A of the uniform joint 11 from the axial direction so as to be inserted and attached. Between an intermediate stage (FIG. 2A) of this inserting and attaching process and the final stage (FIG. 2B), the connection space 13 is communicated with the external portion by the communication passage 21 of the boot adapter 14, and the connection space 13 maintains atmospheric pressure without being compressed.

(3) In the final stage of the inserting and attaching process of the base portion 14A of the boot adapter 14, the base portion 14A is caulked and fixed around the seal member 16 in the outer peripheral portion of the outer wheel 11A, which interrupts the communication generated by the communication passage 21 mentioned in the item (2) and seals the connection space 13 in the atmospheric pressure state of the item (2).

In accordance with the present invention, the following operations and effects can be obtained.

(i) Since the boot adapter 14 secures the communication passage 21 communicating the connection space 13 in an inner portion of the boot 15 with the external portion at least in the intermediate stage of inserting and attaching the base portion 14A to the outer peripheral portion of the outer wheel 11A from the axial direction even in the case of employing an assembling procedure of firstly attaching the boot 15 provided in the front end portion 14B to the inner shaft 12, it is possible to restrict pressure increase of the connection space 13.

(ii) Since no disadvantage is generated even when employing the assembling procedure of firstly attaching the boot 15 provided in the front end portion 14B of the boot adapter 14 to the Inner shaft 12 as mentioned in the item (i), freedom of assembling procedure is increased.

(iii) It is possible to set an internal pressure of the connection space of the connection space 13 mentioned above to the atmospheric pressure by setting the communication passage 21 in the item (i) formed by the boot adapter 14 until the final stage of the inserting and attaching process, and thereafter shutting It.

(iv) It is possible to simultaneously shut the communication passage and fix the adapter and to simply and securely shut by caulking and fixing the base portion 14A of the boot adapter 14 to the outer peripheral portion of the outer wheel 11A so as to shut the communication by means of the communication passage 21 mentioned above.

As heretofore explained, embodiments of the present invention have been described In detail with reference to the drawings. However, the specific configurations of the present invention are not limited to the embodiments but those having a modification of the design within the range of the present invention are also included in the present invention. For example, the communication passage provided in the base portion of the boot adapter in accordance with the present invention may be structured such as to be substantially capable of communicating the connection space with the external portion at least in the intermediate stage of being inserted and attached to the outer peripheral portion of the first member from the axial direction, and is not limited to the groove-like communication passage on the basis of the protruding portion.

Further, the present invention is not limited to the boot mounting structure around the uniform joint, and can be applied to various kinds of joints and various kinds of connection portions, As mentioned above, in accordance with the present invention, it Is possible to restrict the pressure increase of the connection space in the process of inserting and attaching the boot adapter to the first member at a time of sealing the connection space between the first member and the second member by the boot adapter and the boot.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. A method for mounting a boot in which a base portion of a boot adapter is inserted and attached to an outer peripheral portion of a first member so as to seal a connection space between the first member and a second member, and a boot provided in a front end portion of the boot adapter is attached to an outer peripheral portion of the second member, comprising the steps of;

forming the base portion of the boot adapter with a communication passage for communicating said connection space with an external portion until a final stage of being inserted and attached to the outer peripheral portion of the first member from an axial direction, and after this insertion and attachment, the base portion is caulked and fixed to the outer peripheral portion of the first member so as to seal said connection space by closing the communication by said communication passage, wherein the boot adapter uses the base portion inserted and attached to the outer peripheral portion of the first member as an annular fitting portion fitted to the first member with substantially no gap, and is provided with a protruding portion extending in an axial direction in a part in a peripheral direction of the base portion, which forms a groove-like communication passage extending in an axial direction on an inner surface of the protruding portion, wherein the depth of a groove of the groove-like communication passage and an outer diameter and a position of the seal member are set so that the groove-like communication passage forms an interval between the base portion of the boot adapter and the seal member in the outer peripheral portion of the first member in a pre-caulking state in which the base portion of the boot adapter is inserted and attached to the first member, and wherein an axial-direction length A of the protruding portion and the groove-like communication passage provided in the base portion of the boot adapter is set to extend along the length of a total inserting and attaching length B of the base portion with respect to the first member.

* * * * *